March. 4, 1969  J. F. BAUMAN ET AL  3,430,292
APPARATUS FOR THE CONTINUOUS FORMATION
OF TUBULAR ARTICLES Filed April 28, 1967

INVENTORS
Joseph F. Bauman
Stanley P. Rette
BY
ATTORNEY

United States Patent Office 3,430,292
Patented Mar. 4, 1969

3,430,292
APPARATUS FOR THE CONTINUOUS FORMATION OF TUBULAR ARTICLES
Joseph F. Bauman and Stanley P. Rette, Trenton, N.J., assignors to Acme-Hamilton Manufacturing Corporation, Trenton, N.J.
Filed Apr. 28, 1967, Ser. No. 634,673
U.S. Cl. 18—19          9 Claims
Int. Cl. B29c 17/00

ABSTRACT OF THE DISCLOSURE

Apparatus for the manufacture of hollow plastic articles of indefinite length which have a major portion of the length thereof of one longitudinal sectional configuration and minor portions of the length thereof of another longitudinal sectional configuration, to thereby provide individual hollow articles having at one or both ends thereof a molded configuration different from that of the portions thereof intermediate the ends thereof.

Background of the invention

The apparatus of the instant invention constitutes an improvement on known apparatus for forming in a continuous manner, hollow articles such as tubing or the like, from thermoplastic material, as shown in Patent No. 3,280,430. The patented apparatus comprises essentially a plastic extruding head for forming plastic material in continuous tubular form, and molding apparatus for receiving the extruded tubing and converting the same into a given configuration in longitudinal section, as for example, transversely corrugated tubing.

The molding apparatus of said patent comprises essentially a series of molds in the form of split sections; the molds of each section being arranged to move in an endless path; the successive pairs of mold sections meeting in a given path in end to end, moving relation; the freshly extruded tubing being received in the matching mold sections and conformed to the configuration thereof by air pressure applied internally of the extruded tubing.

It is understood that the tubing formed by such patented apparatus and other apparatus known in the art, has a uniform, unchanging configuration in longitudinal section. As it may be desirable to form molded tubing having at intervals along the length thereof, sections of different configuration in longitudinal section; typically, corrugated tubing having cuff portions at the terminal ends thereof; the apparatus of Patent No. 3,280,430 has been improved so that the molded configuration imparted to the freshly extruded plastic tubing may be changed automatically at selected points in the length of the tubing.

Apparatus for forming corrugated plastic tubing is also shown in Patent No. 3,286,305, with provision for molding cuff portions thereon. This apparatus uses molds which are slidably and removably mounted on conveyor means. Thus, regular molds must be replaced by special cuff molds by manually interchanging the same. Such manual interchange operations limit the efficiency of high speed molding of plastic tubing, particularly with frequent shifting from cuffed to uncuffed tubing; as well as changes in the length of tubing between cuffs.

Accordingly, an object of this invention is to provide improved apparatus for forming in a continuous manner, tubular plastic articles, wherein extruded plastic tubing is molded as the same passes through a given path defined by mold sections moving in an endless path; means being provided for interchanging mold sections of one configuration with mold sections of another configuration; the interchange being made in an automatic manner without interruption in the movement of the mold sections.

Another object of this invention is to provide a molding apparatus of the character described, which includes a pair of endless conveyor means arranged so that portions of each of said conveyor means move in a given rectilinear path and in opposed relation to each other; the conveyor means having mounted thereon successive mold sections which are adapted to mate while moving in said rectilinear path to provide a series of longitudinally abutting split molds; each conveyor means further carrying slide means thereon for mounting a pair of mold sections of dissimilar configuration in lateral relation to each other; means being provided for shifting said pair of mold sections laterally, at a determined point in the path of movement thereof, to selectively bring one or the other of the mold sections into operative relation relative to mold sections on said conveyors which precede and succeed said pair of mold sections.

A further object of this invention, is to provide in molding apparatus of the character described, and further including mold shifting means which is operative while the mold sections are moving; and said mold shifting means being adapted to have a programmed operation whereby the mold shifting operation may take place at predetermined time intervals or distances of movement of the conveyors, whereby to vary the length of formed tubing between points of modified molded configuration thereof.

Other objects of this invention will in part be obvious and in part hereinafter pointed out.

Summary of the invention

The instant invention is concerned with a molding apparatus for forming tubular plastic articles of indefinite length and in a continuous manner, the apparatus including mold sections moving in endless paths and correlated to provide split molds moving in a portion of the endless path; a pair of mold sections in lateral relation to each other and being of different mold configurations, being arranged for transverse shifting movement while the mold sections are moving to bring a selected one of the pair of mold sections into operative position.

Brief description of the drawings

FIG. 3 is a side elevational view showing the mating mold sections arranged on the paired conveyor means;

Description of the preferred embodiment

The apparatus of the instant invention is adapted to form molded plastic in a continuous manner, and for the purpose of illustration, is shown particularly to form corrugated plastic tubing. Essentially, the apparatus herein is essentially like that of Patent No. 3,280,430, which shows molding means in association with means for extruding tubing of thermoplastic material; the molding means comprising a pair of endless chain conveyors in vertically spaced arrangement.

The conveyors of Patent 3,280,430 carry mold members having a corrugated mold configuration; said mold members meeting in matched relation in the opposed reaches of the conveyors; the matched mold members being pressed together as they move in a given horizontal path. The plastic tubing is received in the moving mold members and is conformed to the mold surfaces by means of air pressure applied interiorly of the freshly formed tubing, all as set forth in detail in said Patent No. 3,280,430. As all the mold members are similar in mold configuration; the resultant tubing has an unchanged longitudinal sectional configuration, throughout the lenth thereof.

The apparatus of Patent 3,280,430, is modified in accordance with the instant invention, to provide in addition to the repeating mold members of similar mold configuration, at least one pair of mold members of a mold configuration different from that of the repeating mold members. Thus, the one pair of mold members may have a tapered, smooth, uncorrugated mold surface to form cuff portions at predetermined points in the length of the corrugated tubing, to thereby provide integrally cuffed corrugated tubings of selected length.

Figure 1:
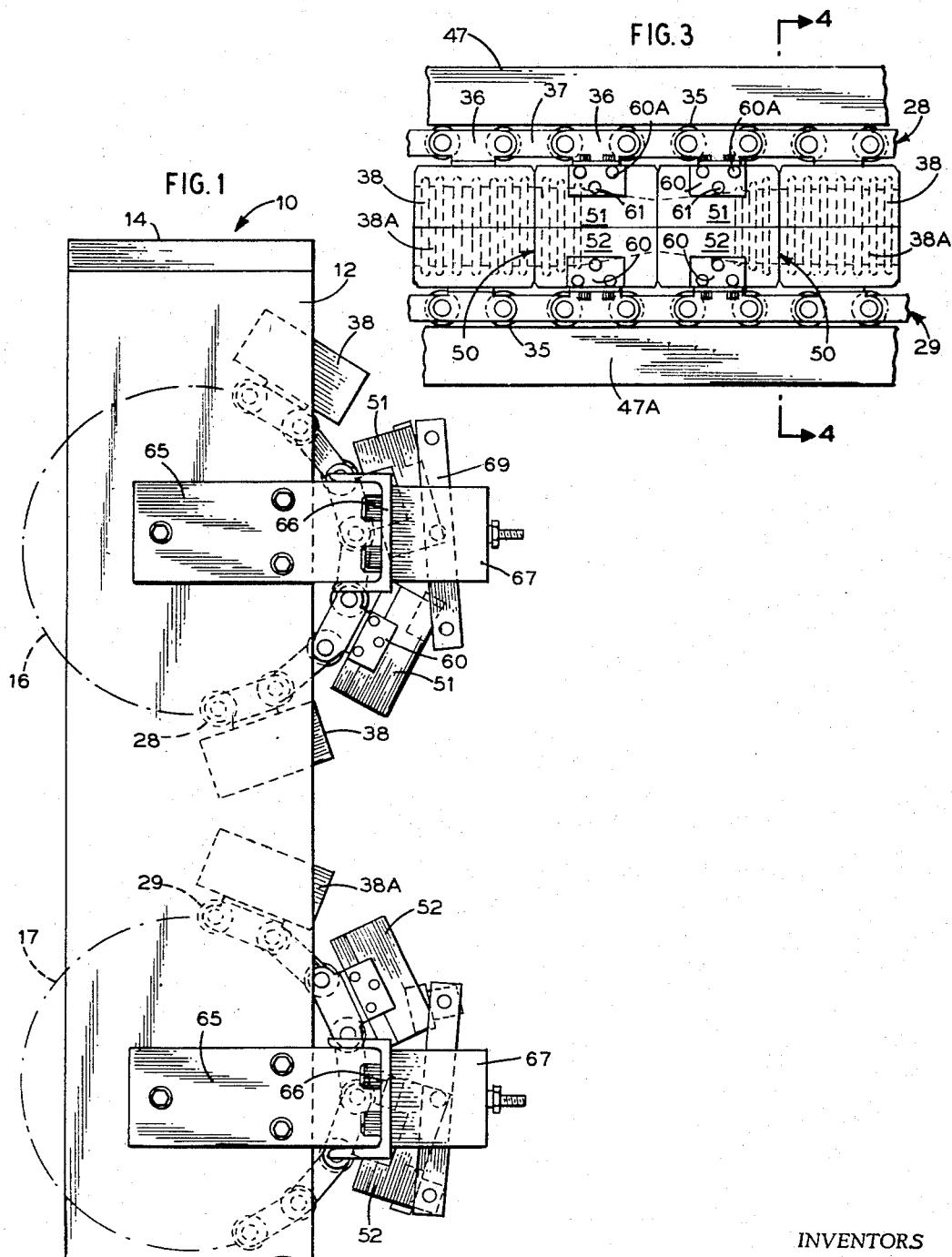
FIG. 1 is a side elevational view of a portion of the molding apparatus of the instant invention.
Figure 2:
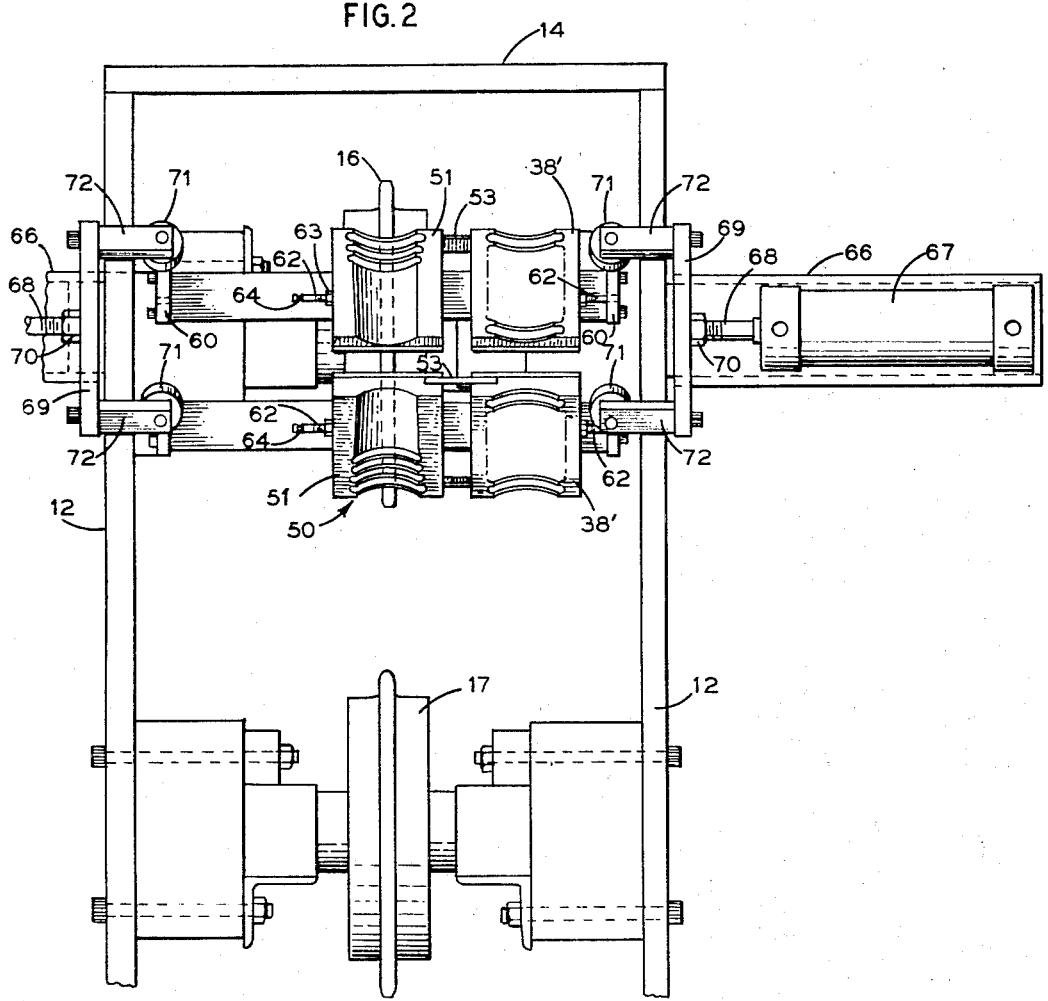
FIG. 2 is an end elevational view thereof.
Figure 4:
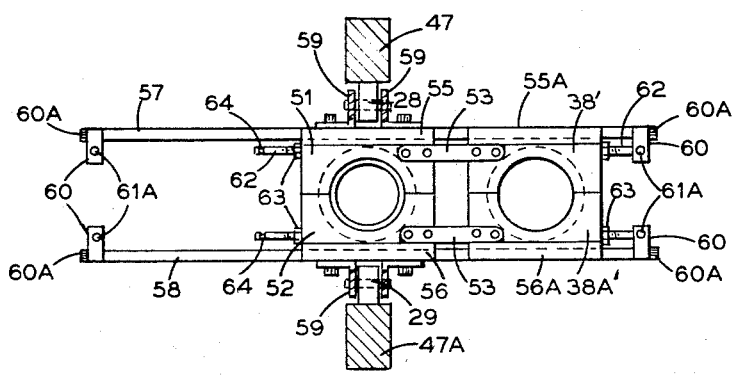
FIG. 4 is a sectional view taken on the line 4—4 of FIG. 3.

Thus, as shown in FIGS. 1–3; 10 designates the right hand end of the molding apparatus shown in detail in Patent No. 3,280,430. Such appartus comprises uprights 12 interconnected at their upper ends by a horizontal member 14; a similar set of uprights, not shown, being located at the left hand end of the apparatus. The uprights provide means for mounting vertically spaced sprocket wheels 16, 17 for carrying endless conveyor means in the form of chains 28, 29.

Chains 28, 29 comprise the usual cross roller members 35 mounted on interpivoted link members 36, 37. The chains 28, 29 carry split molding means in the form of successive mold members 38, 38A respectively. Each of the mold members 38, 38A is formed with a semicircular corrugated mold surface showing the usual alternating peaks and valleys. As the chains 28, 29 move in their endless paths, by way of sprocket wheels 16, 17; matching mold members 38, 38A on opposed reaches of said chains meet in abutting relation and are held tightly together while moving in a horizontal path, by horizonal pressure plates 47, 47A.

The plastic extruding means, not shown, supplies freshly formed plastic tubing to the paired mold members 38, 38A, in a manner detailed in Patent No. 3,280,430, to form corrugated tubing.

Inasmuch as corrugated tubing is normally provided with uncorrugated cuff portions at the terminal ends of a given length of such tubing; which cuff portions are conventionally formed separately from the tubing and then assembled with the tubing; apparatus 10 herein is provided with at least one pair of matched mold members having uncorrugated, smooth tapering cuff forming surfaces.

Thus, as shown in the drawings; cuff molds generally indicated at 50 are provided in tandem relation to regular mold members 38, 38A, such combination being arranged for shifted movement on conveyor chains 28, 29 transversely thereof, whereby mold members 38, 38A of the combination may be displaced from their normal position on said chains to allow cuff molds 50 to assume such position, thereby allowing the formation of cuff portions on the tubing as the same is being corrugated. The cuff molds 50 may then be displaced to their original, inoperative position, thereby restoring regular mold members 38, 38A of the combination to their normal, operative position.

Cuff molds 50 comprise matching sections 51, 52 respectively mounted on chains 28, 29 and which meet and abut on the horizontal, opposed reaches of said chains, FIG. 3. The mold sections 51, 52 are connected respectively in tandem with mold members 38', 38A', similar to mold members 38, 38A, by means of straps 53 whose opposite ends are set flush in recessed end surface portions 54 of said mold sections and mold members.

Interconnected mold sections and members 51, 38'; 52, 38A', are slidably mounted on chains 28, 29 by dovetail slide means comprising slotted plates 55, 56 respectively affixed to outer surface portions of mold sections 51, 52. Similar slotted plates 55A, 56A are respectively affixed to the outer surface portions of mold members 38', 38A'; the slots thereof being aligned with the slots in plates 55, 56.

Elongated dovetail members 57, 58 are respectively affixed to chains 28, 29 by angle members 59; and extend transversely thereof. The tandem interconnected mold members 51, 38'; 52, 38A' are slidably mounted on members 57, 58 by way of their slotted plates 55, 56; 55A, 56A, for lateral shifted movement relative to said chains 28, 29.

Means is provided for limiting the shifted movement of the members 51, 38'; 52, 38A' and to accurately position either set of mold members in longitudinal alignment with preceding and succeeding mold members 38, 38A. To this end, dovetail members 57, 58 have affixed to their opposite ends depending stop plates 60 by screws 60A. Plates 60 are formed with central openings 61 which are intersected by passages 61A for mounting therein spring pressed ball detents, not shown and which resiliently project into openings 61.

Each of the mold members 51, 52; 38', 38A' has a stem 62 threaded at its inner end in a threaded recess in the opposite sides thereof with lock nuts 63 to fix the same in adjusted positions thereof. The outer ends of stems 62 are formed with annual grooves 64. It will be apparent that upon shifted movement of the tandem connected mold members 51, 52; 38', 38A', in either direction, travel thereof will be limited as the grooved end 64 of stems 62 are received in aligned openings 61 in stop plates 60 and retained against inadvertent movement by the spring pressed ball detents, not shown in said plates 60.

Figure 7:
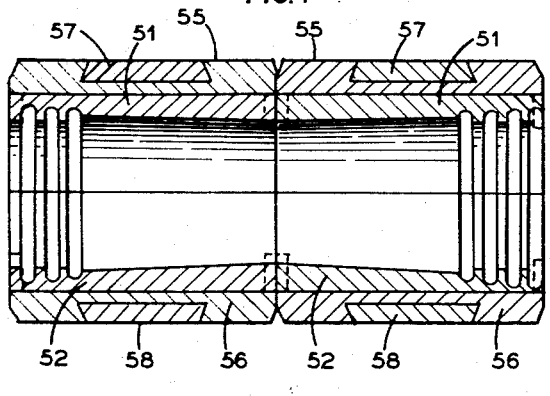
FIG. 7 is a sectional view taken on the line 7—7 of FIG. 6.
Figure 6:
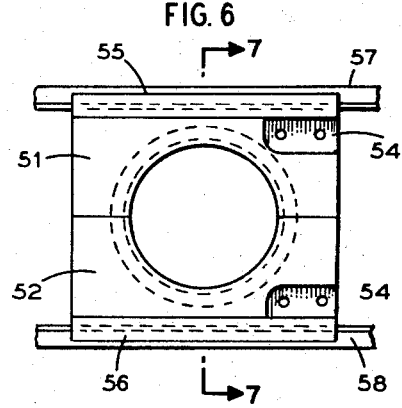
FIG. 6 is an elevational view thereof.
Figure 5:
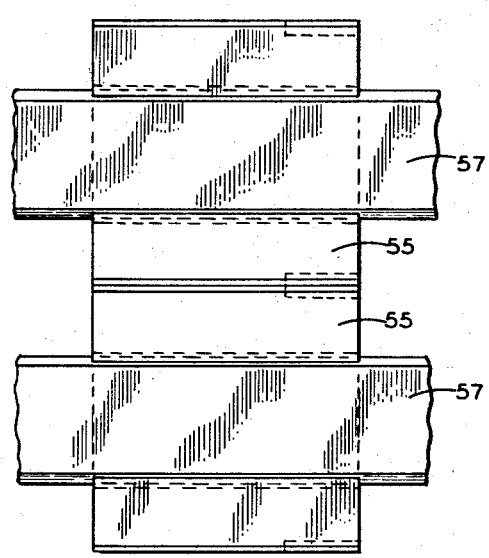
FIG. 5 is a top plan view showing the slide arrangement of the mold sections.

As shown in FIGS. 3, 7; two pairs of mold sections 51, 52 for forming cuff portions on the corrugated tubing, are mounted on chains 28, 29. This allows for the formation of two cuff portions in end to end relation as the corrugated tubing is being molded. Thus, there is provided cuff portions for the leading end of one tubing and the trailing end of another tubing; the adjacent cuff portions being transversely split at the juncture of the said cuff portions.

Means is provided for shifting the tandem mold members 51, 38'; 52, 38A' to selectively bring either mold members 51, 52 or 38', 38A' into operative position. To this end, vertically spaced bracket plates 65 are affixed to the outer surfaces of opposed uprights 12, channel members 66 being affixed to plates 65 and extending outwardly thereof and at right angles thereto. Air cylinder means 67 is mounted on each of channel members 66, with their pistons 68 in horizontal alignment and extending toward each other.

A cross member 69 is swively mounted at a mid portion thereof on the outer end of each of pistons 68; lock nuts 70 securing the same in adjusted angular positions. Rollers 71 are rotatably mounted on the outer ends of posts 72 which in turn are affixed at their inner ends to the outer ends of cross members 69.

Assuming that mold members 38', 38A' are in longitudinal alignment with mold members 38, 38A, then uncuffed corrugated tubing will be formed in a continuous manner. To form cuffed tubing, air cylinders 67 are suitably programmed by control means, not shown, so that at appropriate intervals, upper and lower cylinders 67 on one side of apparatus 10 adjacent mold sections 51, 52, are operative to project their pistons 68 so as to bring rollers 71 thereon to bear against the side surfaces of mold sections 51, 52.

Thus, mold members 38', 38A' will be displaced from their normal positions and to one side of mold members 38, 38A; while mold sections 51, 52 will replace said mold members 38', 38A' and will be aligned with mold members 38, 38A. Thus, cuffs will be molded at intervals in the length of the corrugated tubing. With suitable programming of cylinders 67, the shifting of molds 38', 38A'; 51, 52 may take place at such intervals as to vary the length of tubing between cuffed portions by multiples of the basic length of the tubing defined by the length of the conveyor means. To restore mold members 38', 38A' to their normal positions, upper and lower air cylinders 67 on the other side of apparatus 10, are operated to reverse the movement of the interconnected molds 38', 38A'; 51, 52.

It will be apparent that a plurality of sets of shiftable molds 38', 38A'; 51, 52 may be mounted on chains 28, 29 at suitably spaced intervals. This provides for an increase in the number of possible variations in tubing lengths between the cuffed ends thereof; when combined with suitable programmed operation of the upper and lower air cylinders 67.

It is understood that the apparatus disclosed herein lends itself to the production of various articles of elongated form, in a continuous manner wherein a uniformly molded configuration along the length thereof is interrupted at intervals to vary the molded configuration at such intervals; such as cable jackets and the like.

While the slidable tandem connected mold members shown herein comprise but two different mold sections; it will be apparent that the apparatus herein may be adapted to utilize three different mold sections in tandem connection. Thus, the tubing may be provided with cuffs of different configuration at the opposite ends thereof.

As various changes might be made in the herein disclosed embodiments of the invention without departing from the spirit thereof, it is understood that all matter herein shown or described shall be deemed illustrative and not limiting except as set forth in the appended claims.

What is claimed is:

1. Apparatus for forming molded plastic tubing comprising conveyor means movable in a determined path, first mold means on said conveyor means for continuously molding plastic tubing, said mold means comprising a plurality of successive, similar mold members serially mounted on said conveyor means, second mold means comprising at least one mold member having a mold configuration different from that of said first mentioned mold members, means connecting said one mold member with one of said plurality of mold members in lateral relation to each other, means for mounting said interconnected, laterally related mold members on said conveyor means for conjoint movement between alternative positions thereof relative to said conveyor means, and means for shifting said interconnected laterally related mold members between said alternative positions, wherein, in one position thereof, the mold member of said interconnected mold members in alignment with preceding and succeeding mold members of said first mold means has a mold configuration similar to that of said preceding and succeeding mold members, and in the other position thereof, the mold member of said interconnected mold members in alignment with preceding and succeeding mold members of said first mold means has a mold configuration different from that of said preceding and succeeding mold members.

2. Apparatus as in claim 1 wherein said conveyor means comprises a pair of endless conveyors arranged with opposed reaches thereof moving in a horizontal path, each of said plurality of mold members comprising a pair of split mold sections respectively fixed to said conveyors, each pair of split mold sections being brought into abutting relation during their movement in said horizontal path.

3. Apparatus as in claim 1 wherein said mounting means comprises a pair of slidably related members, one of said slidably related members being elongated and fixed to said conveyor means in transverse relation thereto, the other of said slidably related members being fixed to said interconnected mold members.

4. Apparatus as in claim 3 and further including coacting means on said one slidable member and said interconnected mold members for limiting the shifted movement of said interconnected mold members relative to said conveyor means and retaining said interconnected mold members in the shifted position thereof.

5. Apparatus as in claim 4 wherein said coacting means comprises stop plate means on opposite ends of said one slidable member, said stop plate means having an opening therein and spring pressed detent means projecting into said opening, and stem means projecting from side portions of said interconnected mold members aligned with the openings in said stop plate means, said stem means being formed with an annular groove for releasably receiving said detent means upon shifted movement of said interconnected mold members.

6. Apparatus as in claim 1 wherein said shifting means comprises a pair of horizontally aligned air cylinder means, each air cylinder means including piston means extending toward opposed side portions of said interconnected mold members in one position of said conveyor means, and means on said piston means for making rolling contact with said opposed side portions of said interconnected mold members to allow shifting thereof while said interconnected mold members are moved by said conveyor means.

7. Apparatus as in claim 1 wherein said second mold means comprises a pair of mold members of similar mold configuration in seriatim, symmetrical reation to each other.

8. Apparatus as in claim 1 wherein said one of the plurality of mold members is slidably connected to said conveyor means and the others of said plurality of mold members are fixedly connected to said conveyor means.

9. Apparatus for forming molded plastic in continuous elongated form comprising conveyor means movable in a predetermined path, first molding means on said conveyor means for continuously molding extruded plastic during the movement of said conveyor means, said first molding means comprising a plurality of longitudinally related, successive mold members serially mounted on said conveyor means for abutting relation to each other, second molding means comprising at least one mold member in laterally opposed relation to one mold member of said first molding means, means connecting said laterally related mold members, means for mounting said interconnected mold members for conjoint movement relative to said conveyor means and in directions transverse to the path of movement of said conveyor means, and means for shifting said interconnected mold members to alternative positions in which the respective interconnected mold members are in positions in offset relation to the path of movement of said conveyor means.

References Cited

UNITED STATES PATENTS 2,866,230   12/1958   Holte _____ 18—19
3,286,305   11/1966   Seckel _____ 18—19

WILLIAM J. STEPHENSON, *Primary Examiner.*